United States Patent [19]
Ichimura et al.

[11] Patent Number: 4,885,643
[45] Date of Patent: Dec. 5, 1989

[54] VTR-INTEGRATED CAMERA HAVING PLAYBACK FUNCTION WITH MOVABLE LENS COVER FOR ENABLING RECORDING MODE AND PLAYBACK MODE AND METHOD THEREFOR

[75] Inventors: Shigeru Ichimura, Ibaraki; Seiko Nakasuna, Katsuta; Takeshi Kawarai, Ibaraki; Takanori Nishiyama, Koganei; Shuji Toyoshima, Ibaraki, all of Japan

[73] Assignee: Hitachi, Ltd., Tokyo, Japan

[21] Appl. No.: 151,967

[22] Filed: Feb. 3, 1988

[30] Foreign Application Priority Data

Feb. 6, 1987 [JP] Japan .................................. 62-24510

[51] Int. Cl.[4] .............................................. H04N 5/76
[52] U.S. Cl. .................................... 358/335; 358/906; 358/229
[58] Field of Search ............... 358/335, 906, 909, 229; 354/187, 287, 288, 410, 412; 360/33.1, 60, 35.1

[56] References Cited

U.S. PATENT DOCUMENTS

| | | | |
|---|---|---|---|
| 4,557,574 | 12/1985 | Kohno et al. | 354/288 |
| 4,695,905 | 9/1987 | Utsugi | 358/909 X |
| 4,717,961 | 1/1988 | Miyake et al. | 358/335 X |

OTHER PUBLICATIONS

Catalog—Video Salon, Genko-Sha Co. Ltd., Dec. 30, 1986.

Primary Examiner—Robert L. Richardson
Attorney, Agent, or Firm—Antonelli, Terry & Wands

[57] ABSTRACT

A VTR-integrated camera comprising a VTR unit with recording and playback functions and a camera unit integrated with each other is disclosed. The camera is set in a camera recording stand-by mode when a lid covering the camera unit is moved. Then, the recording can be started simply by operating a recording start button.

15 Claims, 6 Drawing Sheets

VTR-INTEGRATED CAMERA HAVING PLAYBACK FUNCTION WITH MOVABLE LENS COVER FOR ENABLING RECORDING MODE AND PLAYBACK MODE AND METHOD THEREFOR

BACKGROUND OF THE INVENTION

The present invention relates to a VTR-integrated camera having a VTR integrated with a video camera, or more in particular to an VTR-integrated camera equipped with a VTR-playback function and a method of operation thereof.

A technique for simplifying the shooting process with a VTR-integrated camera exclusively used for video recording is introduced in page 36, the December 1986 special issue (published Dec. 30, 1986) of "VIDEO SALON", GENKO-SHA Co., Ltd. According to this conventional technique, a lens cover made of a square panel is arranged to cover the whole width of the body front. When the front part of the camera lens section is opened by pressing down this lens cover in starting shooting operation, a power switch is turned on in interlocked operation therewith, and the remaining shooting operation can be performed simply by depressing a camera start button at the rear part of the grip. This VTR-integrated camera used exclusively for video recording, however, has no playback function and therefore, though easy to operate for shooting a scene, has no function to play a recorded image back on a TV set. A VTR integrated camera having the functions of recording and playback, which is more convenient than a VTR-integrated camera exclusively used for recording, therefore, dominates the market.

After a picture is taken with this VTR-integrated camera having a playback function, an image picked up is capable of being reproduced and viewed through a view finder without taking off a cassette containing the recorded tape out of the camera body.

SUMMARY OF THE INVENTION

The object of the present invention is to provide a VTR-integrated camera having a reproduction function simple to operate and a method of operation thereof.

According to one aspect of the present invention, there is provided a VTR-integrated camera comprising a lid for covering a camera lens unit, first means for switching on power for the camera and rendering a VTR unit ready for recording in interlocked relationship with the operation of moving the lid from the camera lens, a recording start button, and second means for switching off the power of the camera section while at the same time rendering the VTR section ready for playback in interlocked relationship with the operation of covering the camera lens section with the lid.

DESCRIPTION OF THE PREFERRED EMBODIMENTS

Figure 1:
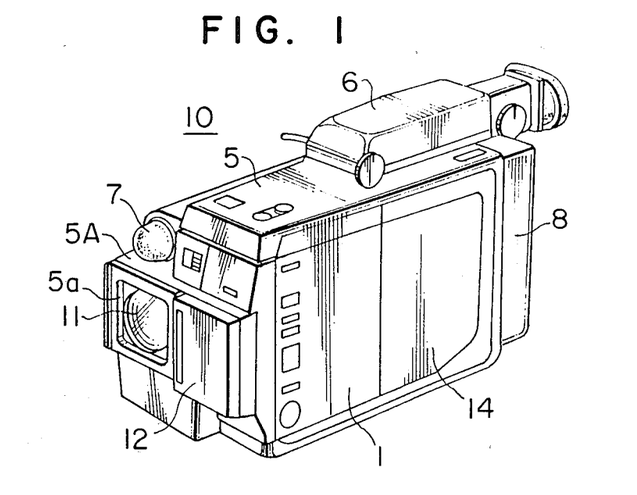
FIG. 1 is an outside view of a VTR-integrated camera according to the present invention as viewed from the forward diagonal direction with the lid opened from the front of the camera lens section by being slid.
Figure 2:
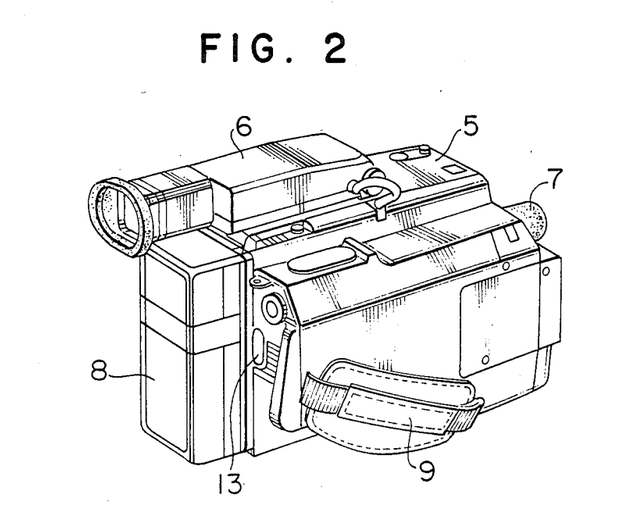
FIG. 2 is an outside view of the same camera as taken from the opposite direction to that in FIG. 1.

An embodiment of the present invention will be explained below with reference to the accompanying drawings. In FIG. 1, reference numeral 10 designates the body of a VTR-integrated camera. A lid 12 that has thus far covered the front part of a camera unit 11 positioned forward of the camera body is shown to have been slid sideways thereby to release the front of the camera unit 11. Under this condition, a power supply is switched on and the camera is in stand-by mode for recording. Specifically, when the lid 12 is slid, power is turned on to render the camera in stand-by mode for recording. It is therefore possible to start the shooting with the camera by depressing a recording start button 13 which is painted red and (FIG. 2) located on the rear side of the camera body. The "stand-by mode for recording" means a condition in which in FIG. 1, the tape is pulled out of a cassette mounted on a VTR unit 1 arranged inside the right side of the VTR-integrated camera body 10 as shown in FIG. 1, and wound around a cylinder of a rotary head to a predetermined angle with a pinch roller in pressure contact with a capstan in what is called "tape-loaded" state. Under this condition, tape is not fed as no turning effort is imparted to the capstan.

The camera unit 11 and the VTR unit 1 arranged inside the right side of VTR-integrated camera body 10 are arranged side by side laterally in FIG. 1. The whole assembly makes up a compact cubic type with all the parts including the camera unit 11 embedded in a case 5. This compactness makes the camera convenient for carrying around for shooting a scene.

An electronic view finder 6 is rotatably mounted on the top surface of the case 5. A microphone 7 is arranged in parallel to the camera unit 11 on the top surface of the case 5 upwardly of the camera unit 11. A battery 8 is mounted removably on the rear side of the case 5. A grip band 9 is provided in proximity to the recording start operation button 13 shown in FIG. 2. The VTR-integrated camera body 10 can be securely held by inserting the right hand between the grip band 9 and the case 5 and grabbing the case 5.

Figure 3:
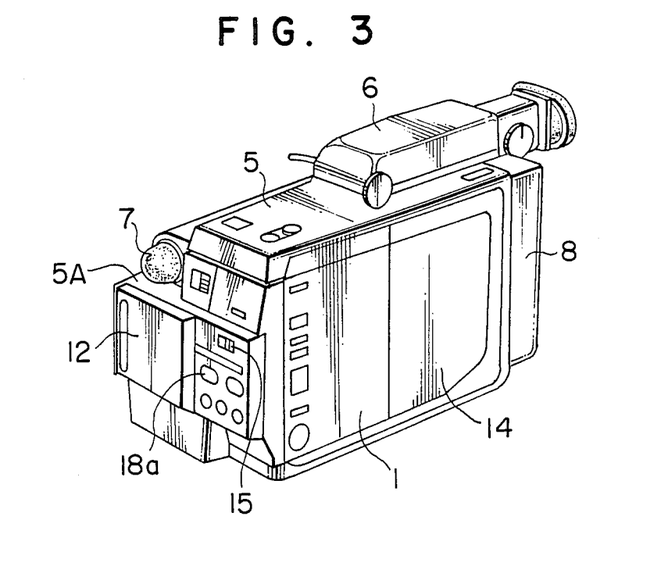
FIG. 3 is an outside view of the same camera with the front of the camera lens section covered with the lid slid in FIG. 1.

FIG. 3 shows the front of the camera unit 11 covered with the lid 12 slid leftward in FIG. 1. Under this condition shown in FIG. 3, the shooting operation is stopped and the playback stand-by mode is restored.

Figure 4:
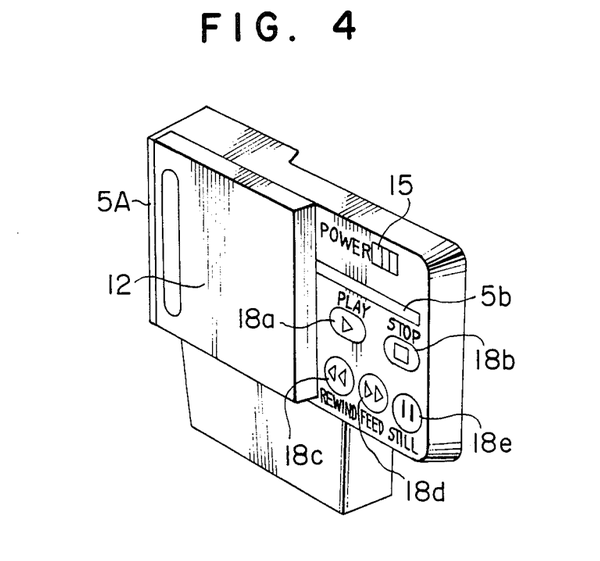
FIG. 4 is an outside view of a mounting case 5A alone in FIG. 3.

The front part of the case 5 makes up a front case 5A in separate form as shown in FIG. 4, in which front case 5A has a lid 12 slidably laterally thereon. The left half of the front case 5A has a hole 5a facing the front part of the camera unit 11 as shown in FIG. 1, while the right half of the front case 5A has mounted in an upper line thereof a slide power operation switch 15 slidably laterally on (the forward part of) the front case 5A. In the middle line of the front case 5A, on the other hand, there are arranged a playback button 18a and a stop button 18b. In the bottom line, there are arranged a rewinding button 18c, a rapid feed button 18d and a still button 18e. The front case 5A has corresponding holes formed for the buttons 18a to 18e, in which holes are fitted the operating buttons 18a to 18e. Each of the buttons 18a to 18e is thus operable from the forward part of the front case 5A.

The VTR cassette tape can thus be ready for playback by sliding the slide power operation button 15 and pressing the playback button 18a.

Figure 7:
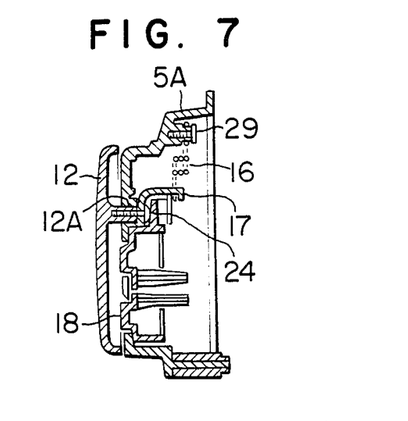
FIG. 7 is a sectional view taken along the line VII—VII in FIG. 6.

In FIG. 4, a lateral slit 5b is formed to extend between the slide power operation button 15 in the upper line and the playback button 18a and the stop button 18b in the middle line of the front case 5a. This lateral slit 5b has inserted therein a cylindrical portion 12A extending from the rear side of the lid 12 from the forward direction (on the left side in FIG. 4) of the front case 5A as shown in FIG. 7. A switch lever 17 is fixed by a screw 24 at the rear end of the cylindrical portion 12A. This switch lever 17 is engaged with an end of a torsion coil spring 16. The other end of the torsion coil spring 16 is fixed by a screw 29 on the rear side of the front case 5A. As a result, the torsion coil spring 16 causes the switch 17 at the other end thereof to slide in lateral directions with the screw 29 as a supporting point thereby energizing the switch 17 in bistable positions.

Figure 5:
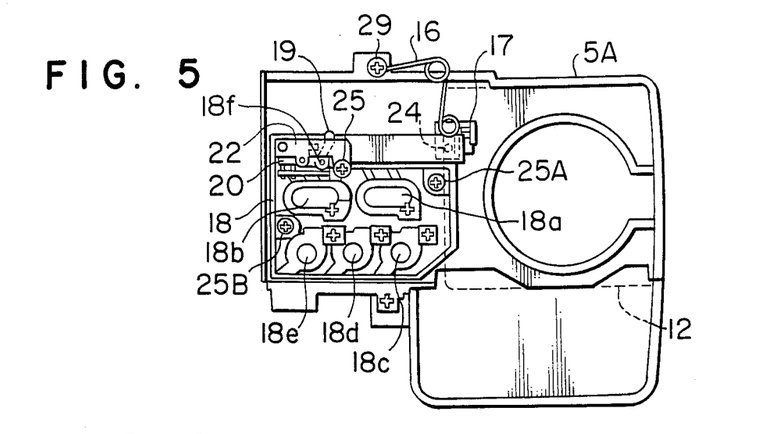
FIG. 5 is an enlarged rear view of the camera shown in FIG. 3 with the lid covering the front of the camera lens section.
Figure 6:
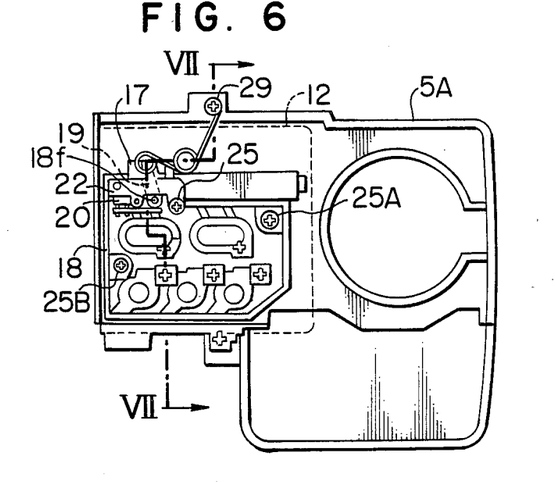
FIG. 6 is an enlarged rear view showing the lid opening the front of the camera lens section as in FIG. 1.

FIG. 5 is a rear view of the front case 5A as taken in FIG. 1. The lid 12 is urged rightward by the torsion coil spring 16 thereby to cover the part forward of the slit 5b. FIG. 6 is a rear view of the front case 5A as taken in FIG. 3. The lid 12 is urged leftward by the torsion coil spring 16, thus covering the fronts of the switches 18a to 18e in FIG. 4. When the lid 12 is slid by hand, therefore, an energization force is stored, so that when the lid 12 is slid by hand to an extent slightly longer than one half, the torsion coil spring 16 advances positively in the opposite direction and stops by hitting the frame of the front case 5A.

A switch block frame 18 is securely fixed on the rear side of the front case 5A by screws 25A and 25B. This switch block frame 18 has formed thereon the playback button 18a, the stop button 18b, the rewinding button 18c, the rapid feed button 18d and the still button 18e explained with reference to FIG. 4, integrally with a mold and together with an arm movable toward this side in FIG. 5.

Figure 8:
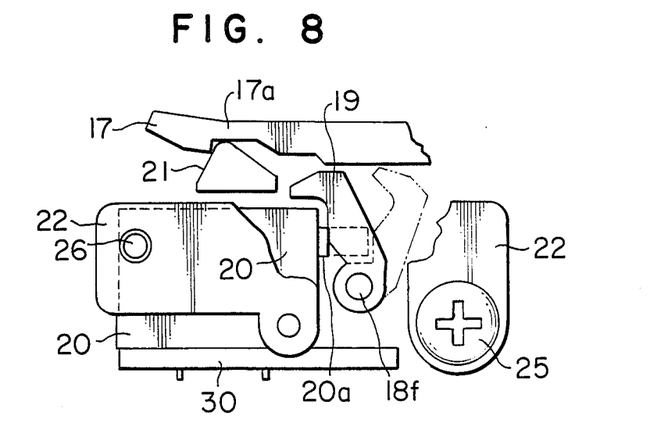
FIG. 8 is an enlarged rear view of the parts surrounding a slide switch in FIG. 6.

In FIGS. 5 and 6, a slide switch 20, a lever 19 and a switch holder 22 are arranged a little upward of the stop button 18b. An enlarged view of these parts is shown in FIG. 8. The switch holder 22 is fixed on the switch block frame 18 shown in FIGS. 5 and 6 by a screw 25. This switch holder 22 has a slide switch 20 held fixedly thereon by a screw 26. The lead leg of the slide switch 20 is soldered to a printed circuit board 30. A lever 19 is mounted rotatably around a boss 18f secured in the switch block frame 18 (FIGS. 5 and 6) in opposed relations with the push portion 20a of the slide switch 20. This lever 19 is adapted to be pressed by the switch lever 17 shown in FIGS. 5 and 6, so that the slide switch 20 turns on or off depending on the position of the switch lever 17. Actually, when tee lid 12 is neither opened as shown in FIG. 6 nor closed as shown in FIG. 5, the bistable set bias of the torsion coil spring 16 exerts the spring force thereof to turn the slide switch 20 forcibly to one of two modes. The slide switch 20, though not shown, is related to two modes including the camera recording stand-by mode and the playback stand-by mode, and therefore the opening and closing operation of the lid 12 causes the camera recording stand-by mode or the playback stand-by mode to be selected.

Figure 9:
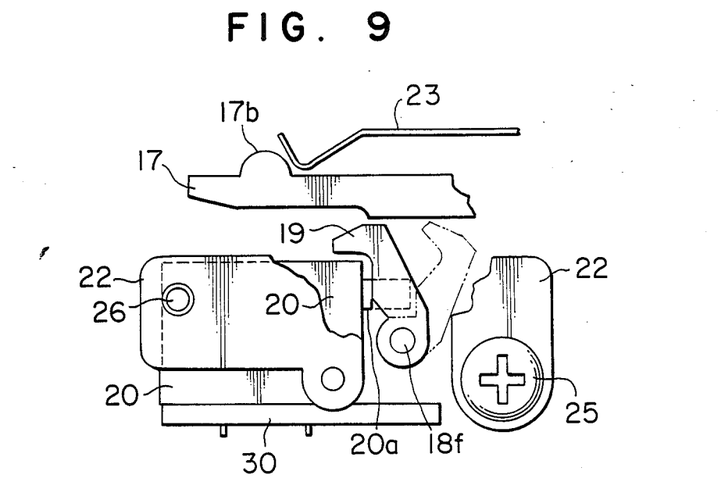
FIG. 9 is an enlarged rear view showing another embodiment of the present invention.

The sliding of the lid 12 causes the switch lever 17 to exert the turning effort to the lever 19 and further a displacement for turning on and off the slide switch 20. A part of the switch lever 17, on the other hand, has a cam-shaped notch 17a formed therein as shown in FIG. 8. Since the whole switch lever 17 is formed as a spring member, the dent 17a comes into contact with a projection 21 secured in the block frame 18, so that when the lid 12 is open, the maximum spring force is exerted thereby to lock the lid 12 open. When the lid 12 makes a slightly further movement to such an extent that the cam-shaped notch 17a of the switch lever 17 rides over the projection 21, the lid 12 is locked. FIG. 9 shows another example, in which a projection 17b is formed in the switch in opposed relations with a spring plate 23 secured on the rear side of the front case 5A, and the spring force is imparted to the switch lever 17 thereby to hold the lid 12 open in a reinforced manner.

Now, the circuit diagram of FIG. 10 will be explained with reference to the flowchart of FIG. 11.

The lid 12 is slid from the position in FIG. 3 to that in FIG. 1 thereby to open the front part of the camera unit 11. In response to the slide motion, the slide switch 20 is turned. In the process, the push portion 20a slides in the direction of arrow in FIG. 10. As a result, the transistor 31 begins to conduct, and a source voltage of 12 V is supplied to an integrated circuits 32 for conversion from 12 V to 5 V, so that the 5 V voltage thus converted is supplied to the power terminal Vcc of the microprocessor 33 and the transistor 34a of a reset circuit 34 at the same time. This reset circuit 34 has time constant due to a zener diode 34b, a capacitor 34c, and a resister 34d whose time constant is selected to be a rise time for the 5 V output terminal to rise from 0 V to 5 V. The reset circuit 34 supplies a "high" reset signal (100 in FIG. 11) to the reset terminal of the microprocessor 33. When this reset signal becomes "low" after the lapse of the rise time with the reset terminal turned off, the microprocessor 33 starts operating. After the start of operation, the RELAY ON terminal becomes "high" (101 in FIG. 11), and 100 msec later (102 in FIG. 11), becomes "low", hereby rendering the RELAY ON terminal "low" (103 in FIG. 11). As a result, a latch relay 35 turns on, and the signal is fed back to the 12 V input terminal of the integrated circuit 32 which converts 12 V to 5 V, thereby holding the 5 V voltage. With the energization of the latch relay 35, the emitter of the transistor 38 connected with the latch relay 35 is supplied with 12 V. The base of the transistor 38 is connected to the slide switch 20. In view of the fact that the push portion 20a is slid in the direction of arrow, the transistor 38 is conducting. As a result, the voltage of 12 V is supplied to the camera unit 11 connected to the collector of the transistor 38, whereby the power supply of the camera unit 11 is turned on. Also, as described above, the sliding of the push portion 20a of the slide switch 20 in the direction of arrow causes the POWER terminal of the microprocessor 33 to become "low" (camera 104 in FIG. 11). As a consequence, the microprocessor 33 produces a signal required for the camera stand-by mode, and drives a loading motor 36 thereby to withdraw the VTR cassettetape out of the cassette while at the same time setting it at a predetermined angle around the rotary head cylinder in what is called a loaded condition. At the same time, the recording pause circuit 37 is energized into REC mode, but no voltage is supplied to the capstan. The camera stand-by state (105 in FIG. 11) is thus entered. Upon the depression of the recording start button 13 (106 in FIG. 11) at the next moment, the REC mode (107 in FIG. 11) is entered. The microprocessor 33 checks to see thereafter whether the REC switch is pressed (108 in FIG. 11), and if it is pressed, returns the process to the camera stand-by mode (105 in FIG. 11) to hold the REC mode. If the recording start button 106 is not pressed, on the other hand, the microprocessor 33 checks whether the push portion 20a of the slide 20 is slid by the camera (109 in FIG. 11), and if it is slid, returns the process to the camera stand-by mode (105 in FIG. 11), thereby waiting for the recording start button (106 in FIG. 11) to be pressed again.

The lid 12 is then slid to the position shown in FIG. 3 from that shown in FIG. 1, thereby covering the front part of the camera unit 11 with the lid 12. In operatively interlocked relations with this sliding motion, the push portion 20a of the slide switch 20 slides in the direction opposite to the direction of the arrow, and the CAMERA terminal of the microprocessor 33 becomes "high". As a result, the microprocessor 33 renders the RELAY OFF terminal "high" (114 in FIG. 11), and renders it "low" (116 in FIG. 11) 30 msec later (115 in FIG. 11). With this fall to "low", the latch relay 35 turns off, thereby stopping supplying power of 12 V.

Figure 10:
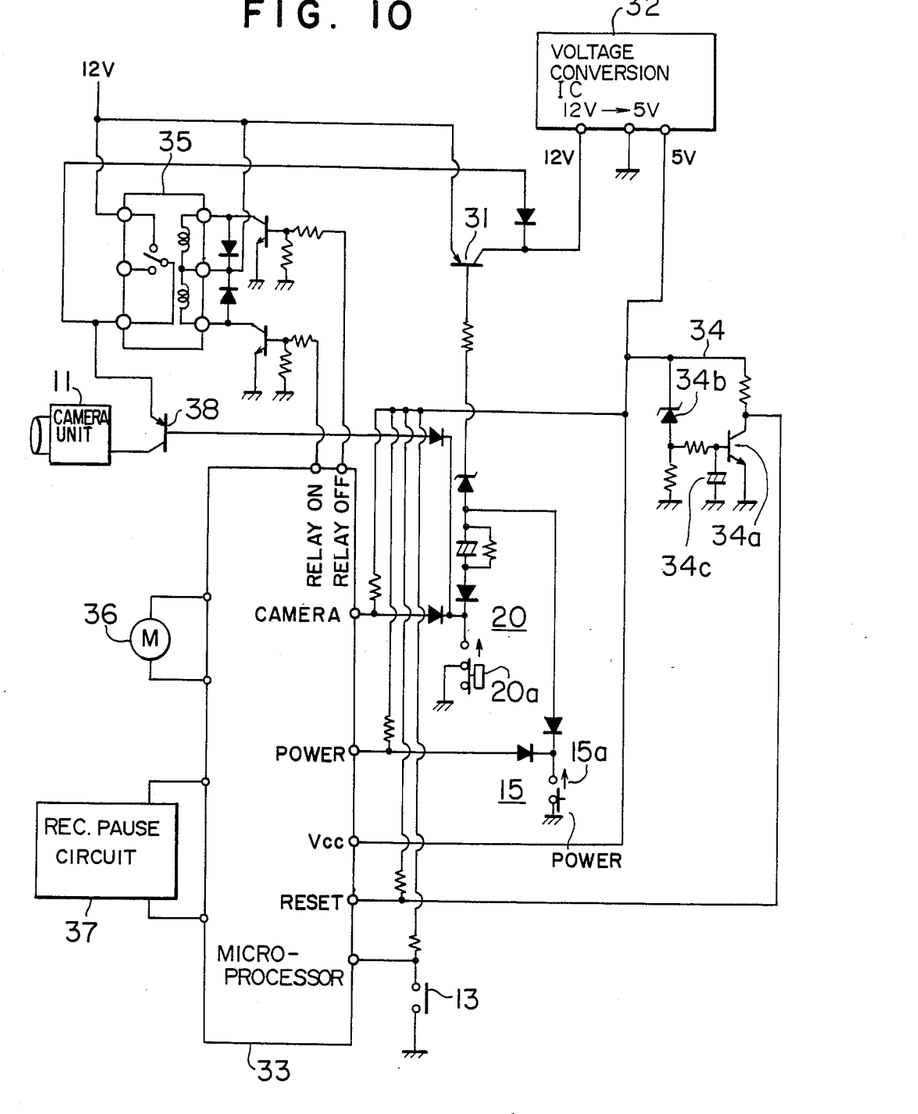
FIG. 10 is a circuit diagram.

When the slide power operation switch 15 is slid in FIG. 3, the button 15a slides in the direction of arrow in FIG. 10, thereby rendering the POWER terminal of the microprocessor 33 (110 in FIG. 11) "low". The power ON condition is thus detected. The button 15a of the power operating switch 15 is connected in parallel to the push portion 20a of the slide switch 20, which parallel circuit is in turn connected to the base of the transistor 31. The microprocessor 33 is thus supplied with power in the same manner as the slide switch 20 as described above and is rendered a stop mode (111 in FIG. 11). Under this condition, if the playback button 18a in FIG. 3 (113 in FIG. 11) is depressed, a playback mode is entered. If a switch other than the playback button 18a is depressed, an operation corresponding to the particular switch is of course performed.

Figure 11:
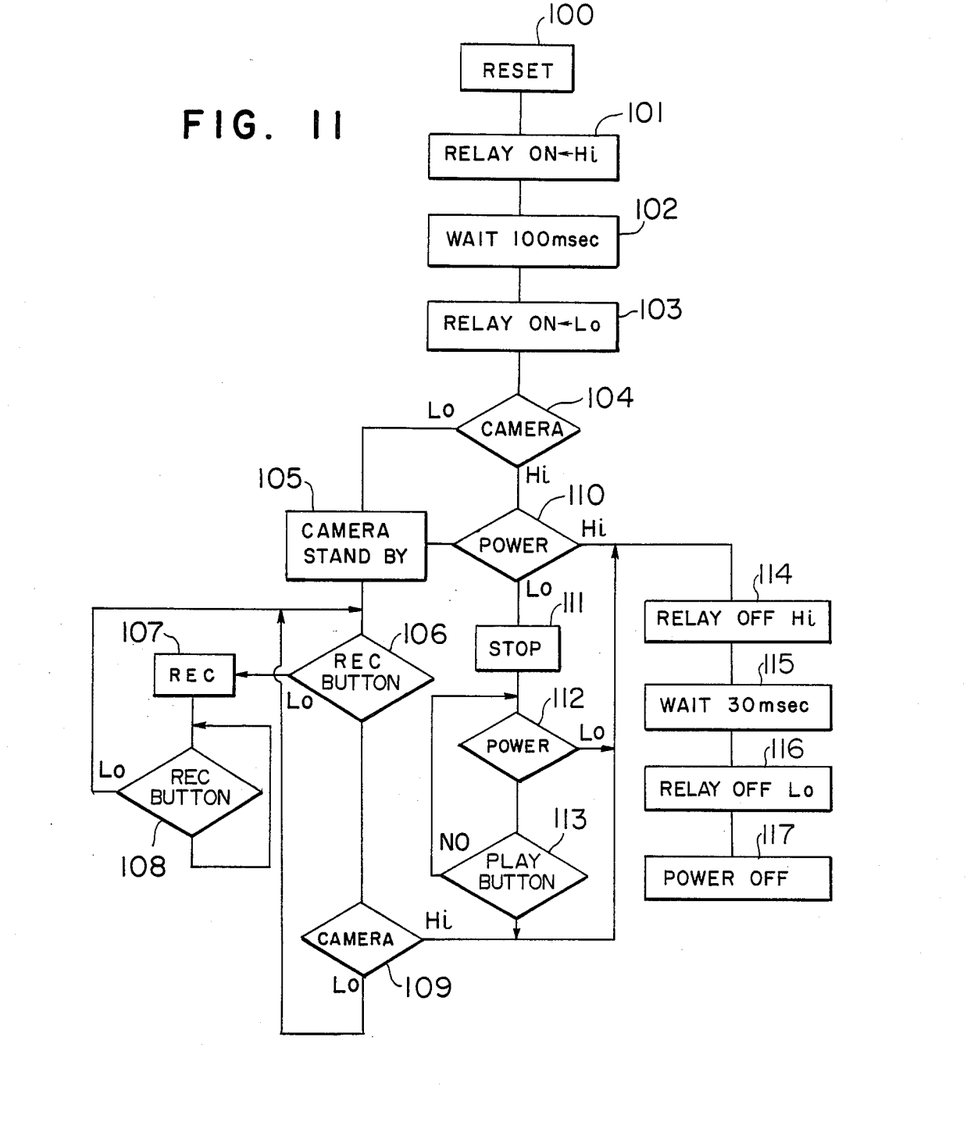
FIG. 11 is a flowchart of the operation of the circuit shown in FIG. 10.

Upon depression of the slide power operation button 15 (FIG. 3) under stop mode (111 in FIG. 11), the POWER terminal of the microprocessor 33 becomes "low" again in FIG. 10 (112 in FIG. 11). As a result, the microprocessor 33 renders the RELAY OFF terminal "high" (114 in FIG. 11) and 30 msec later (115 in FIG. 11), renders it "low" (116 in FIG. 11). The fall to "low" causes the relay 35 to turn off, thereby stopping power supply (117 in FIG. 11).

It will thus be understood from the foregoing description that according to the present invention, there is provided a VTR-integrated camera comprising a VTR having recording and playback functions combined with a video camera section, in which the shooting process can be easily started by simple operation, so to speak 1, 2 operation of a recording start button in view of the fact that a camera enters a recording stand-by mode only by uncovering the lid from the front part of the video camera whenever desired. Also, the playback of shooting images can be started very easily by simple operation of a power switch and a playback button.

What is claimed is:

1. A VTR-integrated camera with a recording function comprising a VTR unit having recording and playback functions and camera unit integrated with each other, wherein the VTR unit is arranged in lateral alignment with the camera unit, and the front part of the VTR unit corresponding to the front part of the camera unit is arranged in substantially the same plane as the front part of the camera unit, said front part of the VTR unit including a lid for covering the front lens part of the camera unit and is movable between a position where the front lens part of the camera unit is covered and a position where the corresponding front part of the VTR unit is covered, said VTR-integrated camera further comprising means for rendering the VTR unit ready for camera recording in operatively interlocked relations with the movement of the lid from a position where the front lens part of the camera unit is covered to another position where the corresponding front part of the VTR unit is covered.

2. A VTR-integrated camera with playback function according to claim 1, further comprising at least power operating means and a playback operating element for the VTR unit arranged on the corresponding front part of the VTR unit, said operating element being covered by the lid when the lid is at the position where the corresponding front part of the VTR unit is covered.

3. A VTR-integrated camera comprising VTR unit having recording and playback functions and camera unit integrated with each other, said camera being of a cubic type in which said camera unit is arranged in lateral alignment with a VTR unit, said camera unit being housed in a case, said camera further comprising a lid slidable between a first position where the front lens part of the camera unit is covered and a second position where the corresponding front part of the VTR unit is covered and control means for switching on a power supply for the camera unit while at the same time rendering the VTR unit ready for camera recording in operatively interlocked relations with the sliding of the lid from the first position to the second position.

4. A VTR-integrated camera according to claim 3, wherein said control means includes a switch adapted to turn in operatively interlocked relations with the sliding of the lid from the first position to the second position, thereby switching on a power supply for the camera unit while at the same time rendering the VTR unit ready for camera recording.

5. A method of operating a VTR-integrated camera comprising VTR unit having recording and playback functions and camera unit integrated with each other, comprising steps of:
 moving a lid covering the front lens part of the camera unit;
 covering a power supply element, playback operating element and the like of the VTR unit with the movement of said lid;
 setting the VTR-integrated camera in a camera recording stand-by mode in operatively interlocked relations with the movement of the lid; and
 starting the camera recording by operating the recording start operating element.

6. A VTR-integrated camera comprising a video tape recording and reproduction unit (VTR) and camera unit integrated with each other, comprising:

a lid movable between a first position where said lid covers a lens unit of said camera unit and a second position where said lid does not cover said lens unit;

first means responsive to movement of said lid from said first position to said second position for turning on a power supply at least for said camera unit so as to enable shooting by said camera unit and recording by said recording unit;

start means for starting operation of said camera unit and said recording unit; and second means responsive to the movement of said lid from said second position to said first position for turning off the power supply for said camera unit while making the reproduction unit ready for reproduction in accordance with the movement of said lid from the second position to the first position;

whereby shooting and recording is effected only by movement of said lid from said first position to said second position and by activation of said start means.

7. A VTR integrated camera according to claim 6, further comprising playback means including a power supply element and VTR operating elements for VTR operation arranged adjacent to the camera unit adapted to be covered with the lid upon movement of the lid from the first position to the second position.

8. A VTR-integrated camera according to claim 6, wherein said first means includes a switch adapted to turn from one state to another in operatively interlocked relations with the movement of the lid from the camera unit, thereby switching on the power supply for the camera unit while at the same time rendering the VTR unit ready for camera recording.

9. A VTR-integrated camera according to claim 8, wherein said second means includes a switch common to said switch adapted to turn from one state to another, thereby switching off the power supply for the camera unit while at the same time rendering the VTR unit ready for playback.

10. A VTR-integrated camera according to claim 6, wherein said lid is mounted slidably between the first position and the second position thereof, and said first means includes a switch adapted to turn from one state to another in operatively interlocked relations with the sliding of the lid from the first position to the second position thereby switching on a power supply for the camera unit while at the same time rendering the VTR means ready for camera recording.

11. A VTR-integrated camera according to claim 10, wherein said second means includes a switch common to said switch adapted to turn from the another state to the one, thereby switching off the power supply for the camera unit while at the same time rendering the VTR unit ready for playback.

12. A television camera incorporated with a camera unit, a recording unit and a reproduction unit, comprising:

a lid movable between a first position where said lid covers a lens unit of said camera unit and a second position where said lid does not cover said lens unit;

switch means responsive to movement of said lid between said first and second positions for enabling change-over between two different modes of operation of said television camera;

means for supplying power to said camera unit in response to the change-over enabled by said switch means;

means for driving a motor to draw out a recording tape from a cassette and wrap the tape around a rotation drum in a predetermined angle in response to the changeover enabled by said switch means;

means for activating the circuit in said recording unit and maintaining a capstan in a stationary condition in response to change-over effected by said switch means;

means for starting operation of said recording unit;

means for stopping supply of power to said camera unit in response to movement of said lid from said second position to said first position;

a power switch for said reproducing unit; and means for starting operation of said reproducing unit;

whereby shooting by said camera unit and recording by said recording unit is effected only by movement of said lid from said first position to said second position and by activation of said means for starting operation of said recording unit.

13. A television camera according to claim 12, wherein said lid covers said power switch for said reproducing unit and said means for starting operation of said reproduction unit in said second position, and in said first position enables operation of said reproducing unit.

14. A method of operating a television camera incorporated with a camera unit, a recording unit and a reproduction unit, comprising the steps of:

moving a lid between a first position where the lid covers a lens unit of the camera unit and a second position where the lid does not cover the lens unit;

turning on a power supply at least to the camera unit response to the movement of the lid from the first position to the second position so as to place the camera unit and the recording unit in a stand-by mode ready for shooting and recording;

starting operation of the camera unit and the recording unit; and turning off the supply of power to the camera unit while enabling reproduction by the reproduction unit in response to movement of the lid from the second position to the first position;

whereby shooting and recording can be effected only by movement of the lid from the first position to the second position and starting the operation of the camera unit and recording unit.

15. A method according to claim 14, wherein movement of the lid from the first position to the second position effects covering by the lid of means for effecting a reproduction operation by the reproduction unit.

* * * * *